US012584344B2

(12) United States Patent
Zhao et al.

(10) Patent No.: US 12,584,344 B2
(45) Date of Patent: Mar. 24, 2026

(54) MOTORIZED COVERING DEVICE

(71) Applicant: HBPO GmbH, Lippstadt (DE)

(72) Inventors: Gaoming Zhao, Lippstadt (DE); Milan Malatak, Hummenne (SK)

(73) Assignee: HBPO GMBH, Lippstadt (DE)

( * ) Notice: Subject to any disclaimer, the term of this patent is extended or adjusted under 35 U.S.C. 154(b) by 446 days.

(21) Appl. No.: 18/308,462

(22) Filed: Apr. 27, 2023

(65) Prior Publication Data

US 2023/0349219 A1 Nov. 2, 2023

(30) Foreign Application Priority Data

Apr. 27, 2022 (DE) .......................... 102022110178.9

(51) Int. Cl.
E05F 15/622 (2015.01)
B60L 53/16 (2019.01)
B60K 15/05 (2006.01)

(52) U.S. Cl.
CPC ........... E05F 15/622 (2015.01); B60L 53/16 (2019.02); B60K 2015/0515 (2013.01); B60K 2015/0523 (2013.01); B60K 2015/0538 (2013.01); E05Y 2201/434 (2013.01); E05Y 2201/702 (2013.01); E05Y 2900/534 (2013.01)

(58) Field of Classification Search
CPC .. E05F 15/622; B60L 53/16; E05Y 2900/534; B62D 25/24; B60K 2015/0523; B60K 2015/0538; B60K 2015/0515
USPC ....................................... 296/97.22
See application file for complete search history.

(56) References Cited

U.S. PATENT DOCUMENTS

| | | | | |
|---|---|---|---|---|
| 10,615,534 B2 * | 4/2020 | Herczeg | ............... | H01R 13/447 |
| 11,466,496 B2 * | 10/2022 | Shin | ......................... | B60L 53/16 |
| 12,203,305 B2 * | 1/2025 | Vlk | ......................... | B60L 53/16 |
| 2017/0356228 A1 * | 12/2017 | Herczeg | ................. | B60K 15/05 |
| 2019/0047428 A1 * | 2/2019 | Sha | ......................... | E05F 15/603 |
| 2020/0223308 A1 * | 7/2020 | Schurz | ................. | E05F 15/603 |
| 2023/0382217 A1 * | 11/2023 | Kaneko | .................. | E05D 15/20 |

(Continued)

FOREIGN PATENT DOCUMENTS

| CN | 112046620 | | 12/2020 | |
|---|---|---|---|---|
| CN | 219134331 U | * | 6/2023 | |
| CN | 219471812 U | * | 8/2023 | .............. B60L 53/16 |

OTHER PUBLICATIONS

Translation of CN219134331 (Year: 2025).*

(Continued)

Primary Examiner — Jason S Morrow

(74) Attorney, Agent, or Firm — Thorpe North & Western, LLP

(57) ABSTRACT

A motor-driven covering device for covering and exposing a charging connection arranged on the body of an electric vehicle with respect to a vehicle exterior can include a cover flap for covering the charging connection in a closed state and for exposing the charging connection in an open state, a motor operatively connected to the cover flap for driving an opening movement and a closing movement of the cover flap, a power transmission device for transmitting a motor power of the motor for performing the opening movement and the closing movement of the cover flap, and a guide element for guiding the cover flap along a movement path during the opening movement and the closing movement of the cover flap.

18 Claims, 10 Drawing Sheets

(56) References Cited

U.S. PATENT DOCUMENTS

| | | | |
|---|---|---|---|
| 2024/0018821 A1* | 1/2024 | Ha ..................... | H01R 13/5213 |
| 2024/0136755 A1* | 4/2024 | Pentia ................... | E05F 15/638 |
| 2024/0328229 A1* | 10/2024 | Peterson ................ | E05B 83/34 |

OTHER PUBLICATIONS

Translation of CN219471812 (Year: 2025).*
German Office Action with English Translation for DE Application
No. 102022110178.9, dated Apr. 27, 2022, 14 pages.

* cited by examiner

MOTORIZED COVERING DEVICE

CROSS REFERENCE TO RELATED APPLICATIONS

This application claims priority to German Patent Application No. 102022110178.9, filed Apr. 27, 2022 which is incorporated herein by reference.

BACKGROUND

Covering devices for covering and exposing charging connections are known from the prior art and are used primarily in motor vehicle technology. The disadvantage of the known devices, apart from the often-low user comfort when covering and exposing, is particularly the relatively high space requirement of electric vehicles during a charging process. The high space requirement results from the fact that the known covering devices are usually swiveled outwards when exposing charging connections and often protrude from the vehicle at a 90° angle in an open state.

The covering devices protruding from the vehicle represent an obstacle that is sometimes difficult for pedestrians to see and with which they can collide. This can result not only in personal injury but also in damage to the covering devices. In addition, the covering devices protruding from the vehicle are often the victims of vandalism, as the covering devices can easily be snapped off by a vehicle due to their unfavorable angle.

Although solutions are also known from the prior art that enable lateral opening and closing, whereby a cover flap is at least partially movable along the body of a vehicle, the known solutions are constructively very complex and therefore correspondingly expensive and susceptible to maintenance.

SUMMARY

A motor-operated covering device and a method for covering and exposing a charging connection can be arranged on the body of an electric vehicle with respect to a vehicle exterior, and to an electric vehicle with such a motor-operated covering device.

Further advantages, features and details of the invention will be apparent from the following description, in which embodiments of the invention are described in detail with reference to the drawings. The features mentioned in the claims and in the description may be essential to the invention individually or in any combination.

Figure 1:
FIG. 1 shows a schematic representation of a part of an electric vehicle, comprising a motor-driven covering device according to the invention in a closed state (II) and an open state (I) in a top view of the body of the electric vehicle according to a first embodiment example.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein.

Accordingly, the scope of the invention should be determined solely by the appended claims and their legal equivalents, rather than by the descriptions and examples given herein.

EXAMPLE EMBODIMENTS

A motor-operated covering device and a method for covering and exposing a charging connection arranged on the body of an electric vehicle with respect to a vehicle exterior, and to an electric vehicle with such a motor-operated covering device is described. The aforementioned disadvantages of known covering devices for covering and exposing charging connections can be overcome. In particular, a covering device for covering and exposing a charging connection can be arranged on the body of an electric vehicle, which has a minimum space requirement during a charging process and at the same time offers safe charging with a high charging comfort as well as safe covering and exposing of a charging connection, and at the same time can be produced in a structurally simple and cost-effective manner.

A device having the features of the independent device claim, an electric vehicle, and a method having the features of the independent method claim can alleviate the aforementioned problems. Further features and details of the invention result from the subclaims, the description and the drawings. Technical features disclosed in relation to the device according to the invention also apply in connection with the electric vehicle according to the invention and the method according to the invention, and vice versa in each case, so that reference is or can always be made mutually with regard to the disclosure of the individual aspects of the invention. Useful embodiments of the invention are set out in the dependent claims.

According to one example, a motor-operated covering device is provided for covering and exposing a charging connection arranged on the body of an electric vehicle with respect to a vehicle exterior. The motor-driven covering device according to the invention comprises a cover flap for covering the charging connection in a closed state and for exposing the charging connection in an open state, a motor operatively connected to the cover flap for driving an opening movement and a closing movement of the cover flap, a power transmission means/device for transmitting a motor power of the motor for carrying out the opening movement and the closing movement of the cover flap, and a guide means/element for guiding the cover flap along a movement path during the opening movement and the closing movement of the cover flap. In this respect, the motor-driven covering device can be characterized in that it is designed/configured in such a way that the cover flap can be moved at least partially along the body of the electric vehicle during the opening and closing movement driven by the motor, wherein a rotary movement of the motor can be transmitted by the power transmission means/device for executing the opening movement and the closing movement of the cover flap, wherein the power transmission means/device is arranged on or parallel to the axis of rotation of the motor and is engaged with the motor without additional means/elements.

In this case, the motor-driven covering device can in particular be designed/configured in such a way that the cover flap can be opened both outwards, in the opposite direction to the charging connection and is pushed out of the plane of the body, and inwards in the direction of the charging connection and is pushed into the plane of the body. In one example, the power transmission means/device is arranged on the axis of rotation of the engine or has an axis of rotation which lies on the axis of rotation of the engine, the axis of rotation of the engine being arranged in particular perpendicular to the plane of the bodywork.

The present covering device for covering and exposing a charging connection arranged on the body of an electric vehicle can be provided in particular for use in at least partially electrically operated motor vehicles. In addition to use in at least partially electrically operated passenger cars or trucks, the covering device can also be used in other at least partially electrically operated means/methods of transport, such as forklift trucks, cranes, ships or flying objects. In particular, the covering device can optionally be in the form of a tailgate covering device for covering and exposing a charging connection.

An electric vehicle—as already mentioned above—is also understood to be a vehicle that can only be partially or temporarily operated electrically, such as a hybrid vehicle or the like. Accordingly, a body of the electric vehicle is understood to mean, in particular, the complete frame or structure of a motor vehicle, comprising fenders, rear wings, front end module, boot, bonnet and the like. A charging connection is understood to mean in particular the receptacle unit for inserting a charging plug. Furthermore, a vehicle exterior is understood to mean in particular the environment of the electric vehicle adjacent to the vehicle body without additional means/element. Furthermore, a cover flap is understood to mean in particular a flat, planar flap or plate. The cover flap can have various shapes, for example round, oval, rectangular, elliptical or similar shapes. In one example, during an opening and closing movement, the cover flap is motor-driven and can be moved along the body of the electric vehicle perpendicular to a direction of insertion of a charging plug from a vehicle exterior into the charging connection. In the context of the present disclosure, the fact that the power transmission means/device is arranged on or parallel to the axis of rotation of the motor can be understood in such a way that the power transmission means/device has an axis of rotation which is arranged on or parallel to the axis of rotation of the motor. In one alternative, the axis of rotation of the power transmission means lies along the main longitudinal extension of the power transmission means/device.

In the context of a compact arrangement and precise and effective control, it can be provided in particular that the power transmission means/device is formed in the form of a linear drive, wherein the linear drive has at least one drive spindle and a control head, which is operatively connected to the drive spindle, for transmitting a motor power of the motor in order to execute the opening movement and the closing movement of the cover flap. The control head can be arranged around the drive spindle so that the drive spindle and the control head are arranged on the same axis or rotate about the same axis of rotation during an opening and closing movement of the present covering device.

With regard to a compact, stable and low-maintenance arrangement, it can also be provided that the drive spindle has a drive thread and a drive pin arranged at the end for insertion into an opening of the motor, wherein the drive thread can be designed/configured in the form of an external thread, which is designed/configured particularly to correspond in shape to a drive thread of the control head. Such an arrangement not only enables a simple, e.g., positive-locking attachment of the power transmission means/device to the motor, but also ensures simple replacement in the event of a necessary repair or the like.

In the context of effective power transmission, it is also conceivable that the control head has a drive thread and fixing bars for fixing the control head during an opening movement and a closing movement, wherein the drive thread is designed/configured in the form of an internal thread, which in particular corresponds in shape to a drive thread of the drive spindle. In particular, it can be provided that at least three fixing bars are arranged on the control head. In addition to a fixed arrangement of the fixing bars on the control head, the fixing bars can optionally also not be fixed to the control head, but can be connected to it, e.g., integrated into a cover carrier or the like.

With regard to a structurally uncomplicated arrangement with precise controllability, it can also be provided that the motor is formed in the form of an actuator, the motor having an opening for receiving the drive pin of the drive spindle. Within the framework of such an arrangement, it can be provided in particular that the drive spindle engages directly via the drive pin with the motor, which is preferably formed in the form of an actuator, and is driven or can be driven directly by the latter. This enables a constructively simple and low-maintenance design/configuration in which, in addition, a particularly effective power transmission is made possible.

In order to enable precise and effective control possible, it can be advantageous in particular that the guide means/element is formed in a plurality of parts and comprises at least one carrier element for fixing the cover flap and a base element, which is operatively connected to the carrier element, for positioning between the motor and the carrier element.

In this case, the carrier element can have a front surface unit and a guide tube arranged at the front surface unit for receiving a control tube of the base element, the guide tube optionally extending perpendicularly to the front surface unit. In the context of a structure that is as compact and stable as possible, it can be particularly advantageous if the front surface unit and the guide tube are of monolithic design/configuration. In the form of a monolithic design/configuration, it is particularly conceivable that the carrier element is made of a plastic, in particular via an injection molding process.

Within the framework of a simple, in particular, exchangeable fastening, it can also be advantageous that the front surface unit of the carrier element has recesses for receiving fixing pins of the cover flap in a form-corresponding manner, the recesses differing in shape and orientation. A differentiation of the recesses in shape and orientation enables in particular a stable and reliably aligned fastening.

It can also be advantageous if the base element has a carrying frame and a control tube arranged on the carrying frame for receiving the drive spindle and the control head, where the control tube preferably extends perpendicularly to the carrying frame. The guide tube of the carrier element can in particular be arranged on the same axis as the control tube of the base element and receive the control tube. In the context of a structure that is as compact and stable as possible, it can also be provided that the carrying frame and the control tube arranged on the carrying frame are monolithic.

For simple and quick fastening, it can also be advantageous if fixing elements are provided for fixing the base element to a vehicle body, the fixing elements optionally being arranged on the carrying frame.

In the context of safe and reliable guidance of the power transmission means/device during an opening and closing movement, it can also advantageously be provided that the control tube has a guide channel for guiding the control head, the guide channel optionally having recesses arranged at the ends and corresponding in shape for receiving and/or guiding out the fixing bars of the control head. The control head can then be introduced into or guided out of the guide channel of the control tube via the recesses arranged at the ends.

In order to ensure an axial movement and a radial movement of the cover flap during an opening and closing movement, it can also be provided in particular that the guide channel for guiding the control head has an axially running guide channel course for axial guidance of the control head over the fixing bars and a radially running guide channel course arranged at the end for radial guidance of the control head. The axial guide channel course can be used in particular to ensure the translational movement of the cover flap into the body or out of the body, whereas the radial guide channel course ensures a swiveling motion of the cover flap. The control head can be initially guided in an axial direction through the guide channel until the pitch of the guide channel changes at the transition between the axial guide channel course and the radial guide channel course, so that the control head together with the carrier element and the cover flap rotates away laterally in front of or behind a body opening.

Within the scope of a covering device that is easy to construct and can be precisely controlled, it can be provided that the motor-driven covering device is designed/configured in such a way that the cover flap can be moved in an opening movement driven by the motor initially perpendicularly to the body counter to the direction of the charging connection or in the direction of the charging connection, wherein the opening movement is optionally drivable via a rotation of the motor in the opposite direction to the rotation during the closing movement, in particular wherein rotation of the drive spindle and a rotation and/or translation of the control head is producible via the rotation of the motor. With regard to a construction space-saving design/configuration (in the case of an opening inwards into the body) and an outwards space-saving design/configuration (in the case of an opening outwards from the body), the movement perpendicular to the body can preferably be limited to less than 5 cm.

With regard to a motor-operated covering device that is easy to construct and can be opened in a space-saving manner, it can also be advantageously provided that the motor-operated covering device is designed/configured in such a way that the cover flap can be rotated laterally along the body in a rotational movement at the end of an opening movement after a movement perpendicular to the body counter to the direction of the charging connection or in the direction of the charging connection. Both the translational movement perpendicular to the body against the direction of the charging connection or in the direction of the charging connection and the rotational movement laterally along the body can advantageously be generated by an interaction of the control head and the course of the guide channel. During the translational movement, the control head can be guided through the axially running guide channel course, whereby the control head can simultaneously push away or pull along the carrier element and thus also the cover flap. In the radially running guide channel course, a lateral rotation of the control head and thus also of the carrier element including the cover flap can then take place.

Likewise, with regard to a motor-operated covering device that is easy to construct and can be opened in a space-saving manner or in the context of a covering device that is easy to construct and can be precisely controlled, it can also be provided that the motor-driven covering device is designed/configured in such a way that the cover flap can first be rotated laterally along the body in a closing movement driven by the motor, before the cover flap, driven by the motor, can be moved perpendicularly to the body either against the direction of the charging connection or in the direction of the charging connection, the closing movement preferably being drivable via a rotation of the motor in the opposite direction to the rotation during the opening movement, wherein a rotation of the drive spindle and a rotation and/or translation of the control head can be generated via rotation of the motor.

Consistent with the above description, an electric vehicle can comprise a charging connection for the insertion of a charging plug and a motor-driven covering device described above. Thus, the electric vehicle brings the same advantages as have already been described in detail with respect to the motor-driven covering device according to the invention. Here, the charging connection can optionally be formed to accommodate or introduce charging plugs of European standards, such as standard type 2 plugs, CCS2 plugs, but also for charging plugs of Japanese, Chinese or American standards.

With regard to an advantageous arrangement of the charging connection, it can be advantageously provided that the charging connection is arranged in the side of the electric vehicle, optionally arranged inside the fender or the rear wing of the electric vehicle.

It is also conceivable that the charging connection is arranged in the front area of the electric vehicle, optionally within the front-end module, in particular within the radiator grille.

A method for covering and exposing a charging connection can be arranged on the body of an electric vehicle with respect to a vehicle exterior, in particular using a motor-driven covering device as described above. In this case, the method comprises the steps/stages of controlling a motor which is operatively connected to a cover flap in order to drive an opening movement and a closing movement of the cover flap, transmitting a motor power of the motor via a power transmission means/device in order to execute the opening movement and the closing movement of the cover flap, and guiding the cover flap along a movement path during the opening movement and the closing movement of the cover flap by means of a guide means/element, wherein the cover flap is moved at least partially along the body of the electric vehicle during the opening and closing movement in a motor-driven manner, wherein a rotary movement of the motor on or parallel to the axis of rotation of the motor is transmitted by the power transmission means/device without additional means/elements in order to carry out the opening movement and the closing movement of the cover flap. Thus, the method brings about the same advantages as have already been described in detail with respect to the motor-driven covering device or the electric vehicle as described.

With regard to a particularly convenient embodiment of the present method, it can advantageously be provided that, before a controlling of a motor which is operatively connected to a cover flap, an opening and/or closing command for opening and/or closing the cover flap is detected by means of a sensor, the sensor preferably being in the form of a movement sensor and/or proximity sensor, in particular in the form of a capacitive sensor.

Preferably, by means of the sensor, a movement gesture, for example a wiping movement or the like, is identified as an opening and/or closing command to cover or release the subject motor-driven covering device. Likewise, the sensor can detect a loading robot or the like that can automatically load a parked vehicle, for example. It is also conceivable that an opening and/or closing command is given by means of the sensor via interaction with a smartphone or other user terminal.

With regard to a space-saving and precisely controllable opening and closing, it can further be provided that during an opening and closing movement of the cover flap, a movement of the cover flap is carried out in the direction of the body or away from the body. In particular, during an opening movement of the cover flap, first an axial translation movement of the cover flap is carried out counter to or in the direction of the charging connection, before a radial swiveling motion is carried out at the end of an opening movement of the cover flap. Furthermore, it may be advantageous if, during a closing movement of the cover flap, a radial swiveling motion is first performed before an axial translational movement of the cover flap is performed against or in the direction of the charging connection.

FIG. 1 shows a schematic representation of a part of an electric vehicle (6), comprising a motor-driven covering device (2) in a closed state II and an open state I.

As can be seen from FIG. 1, in a closed state II the cover flap (10) covers the charging connection (8) with respect to a vehicle exterior (16), whereas in an open state I the cover flap (10) is at least partially displaced laterally behind the body (4) of the electric vehicle (6).

Figure 2:
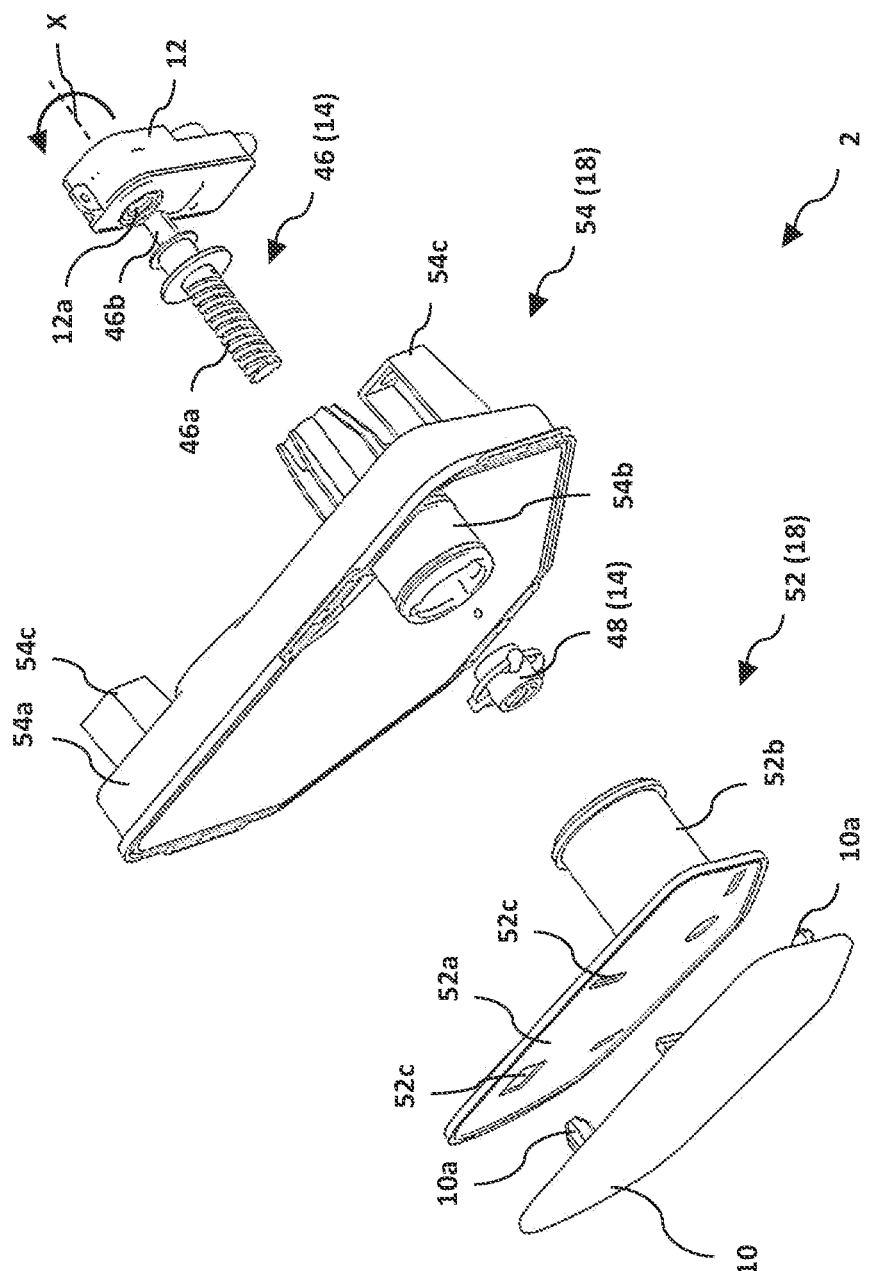
FIG. 2 shows a schematic representation of a motor-driven covering device in an exploded view according to a first embodiment example.

FIG. 2 shows a schematic representation of a motor-driven covering device (2) in an exploded view according to a first embodiment example.

As can be seen according to FIG. 2, the motor-driven covering device (2) comprises a cover flap (10), a motor (12) operatively connected to the cover flap (10) for driving an opening movement and a closing movement of the cover flap (10), a power transmission means/device (14) for transmitting a motor power of the motor (12) for executing the opening movement and the closing movement of the cover flap (10), and a guide means/element (18) for guiding the cover flap (10) along a movement path during the opening movement and the closing movement of the cover flap (10). In this case, the motor-driven covering device (2) in question is designed/configured in such a way that the cover flap (10) can be moved at least partially along the body (4) of the electric vehicle (6) during the opening and closing movement, driven by the motor, it being possible for a rotational movement of the motor (12) to be transmitted by the power transmission means/device (14) in order to execute the opening movement and the closing movement of the cover flap (10), the power transmission means/device (14) being arranged on the axis of rotation (X) of the motor (12) and being in engagement with the motor (12) without additional means/elements.

In the present case, the power transmission means/device (14) is designed/configured in the form of a linear drive, the linear drive having at least one drive spindle (46) and a control head (48), which is operatively connected to the drive spindle (46), for transmitting a motor power of the motor (12) in order to execute the opening movement and the closing movement of the cover flap (10).

The drive spindle (46) further comprises a drive thread (46a) and a drive pin (46b) arranged at the end for insertion into an opening (12a) of the motor (12), which in the present case is designed/configured in the form of an actuator.

Furthermore, it can be seen according to FIG. 2 that the guide means/element (18) is formed in a plurality of parts and has at least one carrier element (52) for fixing the cover flap (10) and a base element (54), which is operatively connected to the carrier element (52), for positioning between the motor (12) and the one carrier element (52).

The carrier element (52) comprises a front surface unit (52a) and a guide tube (52b) arranged at the front surface unit (52a) for receiving a control tube (54b) of the base element (54), wherein the guide tube (52b) extends perpendicularly to the front surface unit (52a).

In addition, the front surface unit (52a) of the carrier element (52) has recesses (52c) for receiving fixing pins (10a) of the cover flap (10) in a form-corresponding manner, in which recesses differ in shape and orientation.

The base element (54) further comprises a carrying frame (54a) and a control tube (54b) arranged on the carrying frame (54a) for receiving the drive spindle (46) and the control head (48). Furthermore, fixing elements (54c) are provided on the base element (54) for fixing the base element (54) to a vehicle body.

Figure 3:
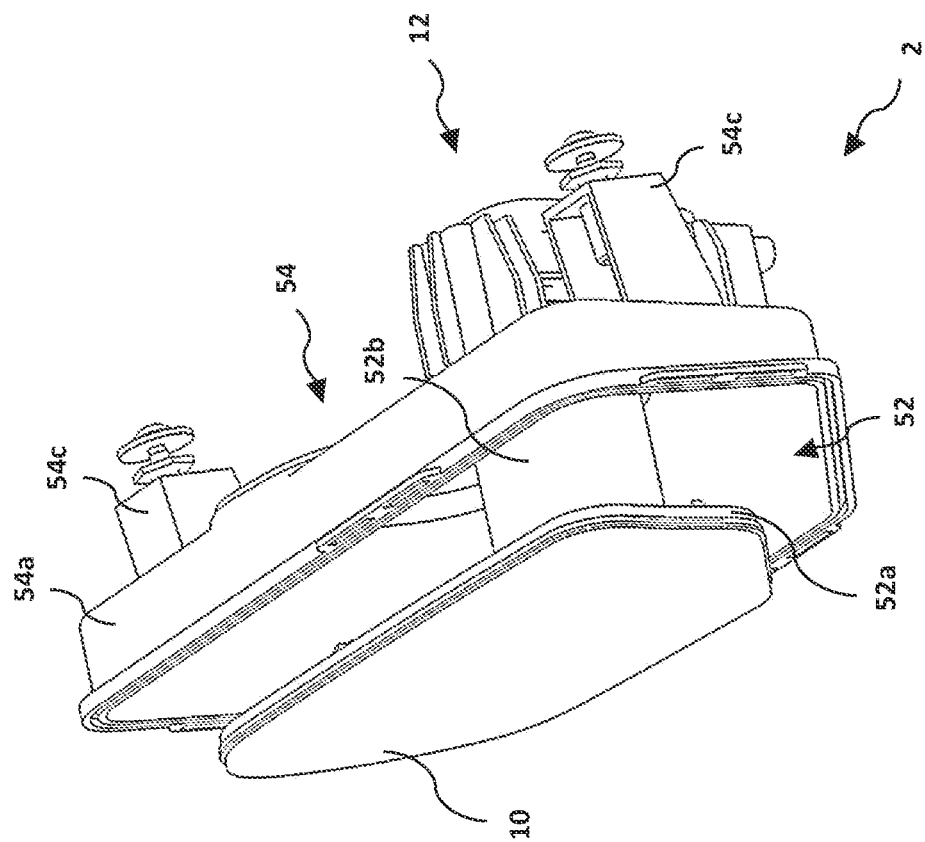
FIG. 3 shows a schematic representation of a motor-driven covering device in a spatial representation in an assembled state according to a first embodiment example.

FIG. 3 shows a schematic representation of a motor-driven covering device (2) in a spatial representation in an assembled state according to a first embodiment example.

In the assembled state, it can be seen that the control tube (54b) of the base element (54) is arranged in the guide tube (52b) of the carrier element (52).

Figure 4:
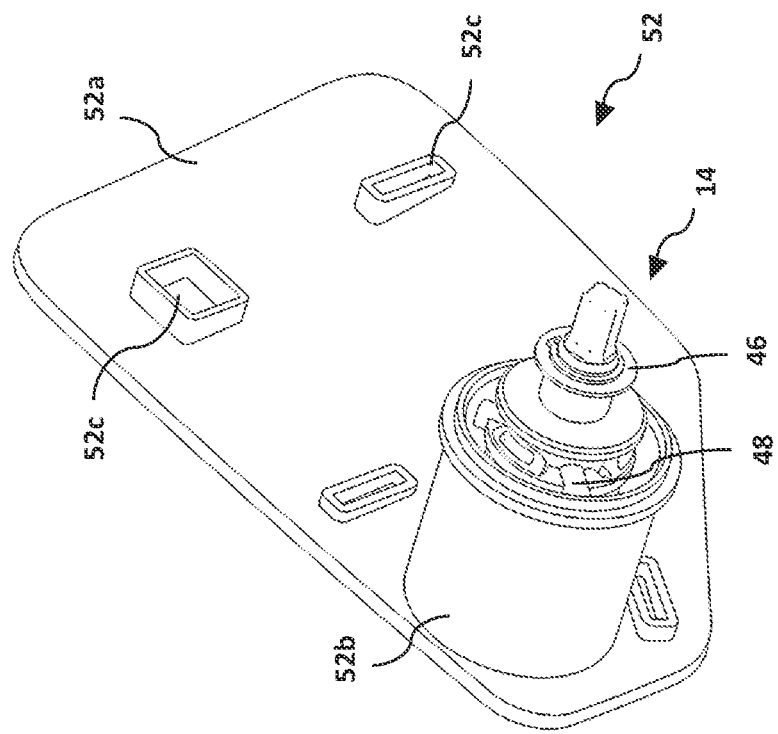
FIG. 4 shows a schematic representation of a carrier element in a spatial representation according to a first embodiment example.

FIG. 4 shows a schematic representation of a carrier element (52) in a spatial representation according to a first embodiment example.

Here, the arrangement of a power transmission means/device (14) in the form of a drive spindle (46) with control head (48) in the guide tube (52b) can be seen.

Figure 5:
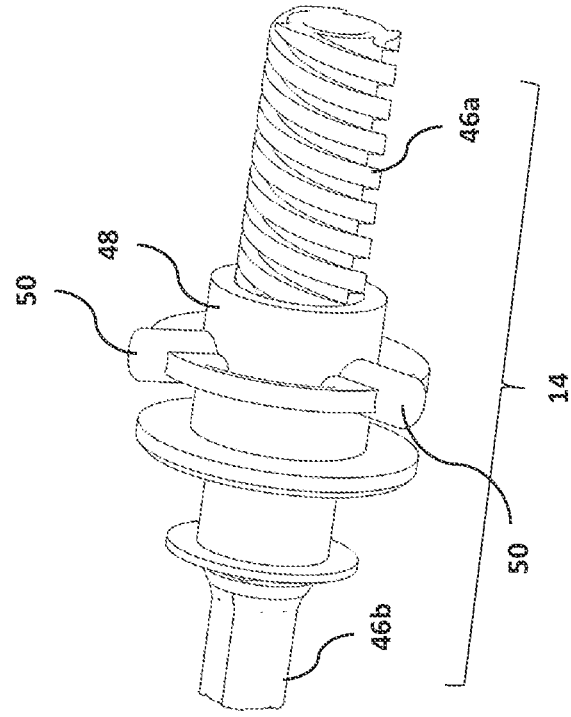
FIG. 5 shows a schematic representation of a part of a power transmission means/device (left) as well as a power transmission means/device (right) according to a first embodiment example.
Figure 5:
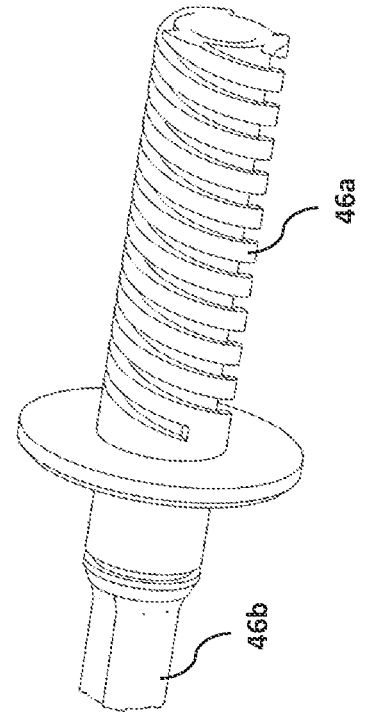

FIG. 5 shows a schematic representation of a part of a power transmission means/device (14) (left) as well as a transmission means/device (14) (right) according to a first embodiment example.

As can be seen in FIG. 5, the power transmission means/device (14) comprises a drive spindle (46) with a control head (48), the drive spindle (46) having a drive thread (46a) and a drive pin (46b) arranged at the end, and the control head (48) in this case having three fixing bars (50) for fixing the control head (48) during an opening movement and a closing movement.

Figure 6:
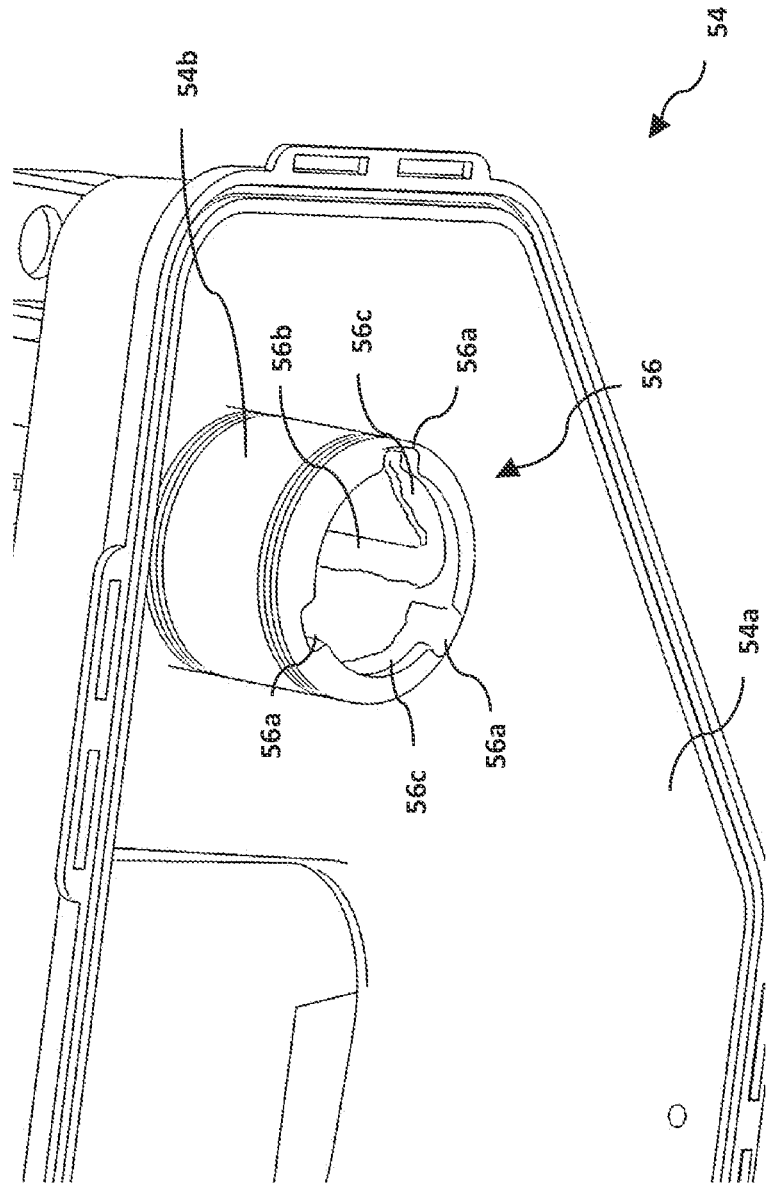
FIG. 6 shows a schematic representation of a base element in a spatial representation according to a first embodiment example.
Figure 7:
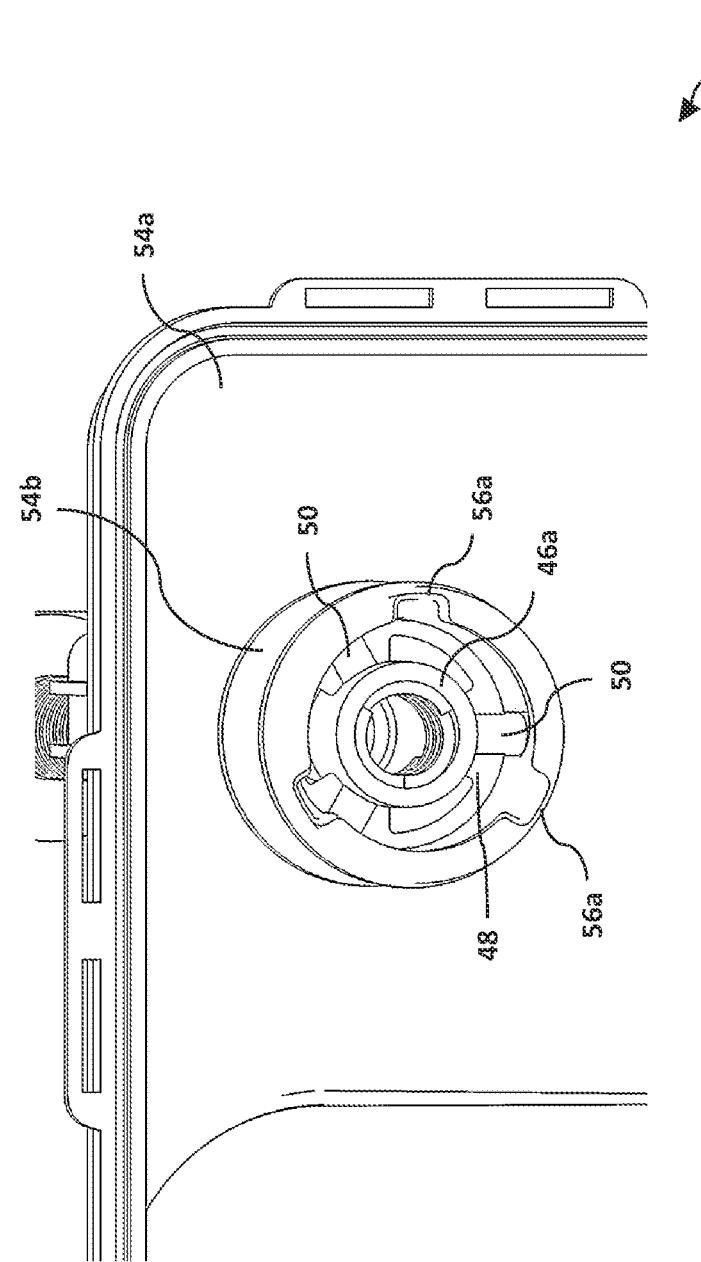
FIG. 7 shows a further schematic representation of a base element in a spatial representation according to a first embodiment example.

FIGS. 6 and 7 show a schematic representation of a base element (54) in a spatial representation according to a first embodiment example.

It can be seen in the figures that the control tube (54b) of the base element (54) has a guide channel (56) for guiding the control head (48), wherein the guide channel (56) has recesses (56a) corresponding in shape and arranged at the ends for receiving and/or guiding out the fixing bars (50) of the control head (48).

Furthermore, the guide channel (56) for guiding the control head (48) has an axially running guide channel course (56b) for axially guiding the control head (48) over the fixing bars (50) and a radially running guide channel course (56c) arranged at the end for radially guiding the control head (48).

Figure 8:
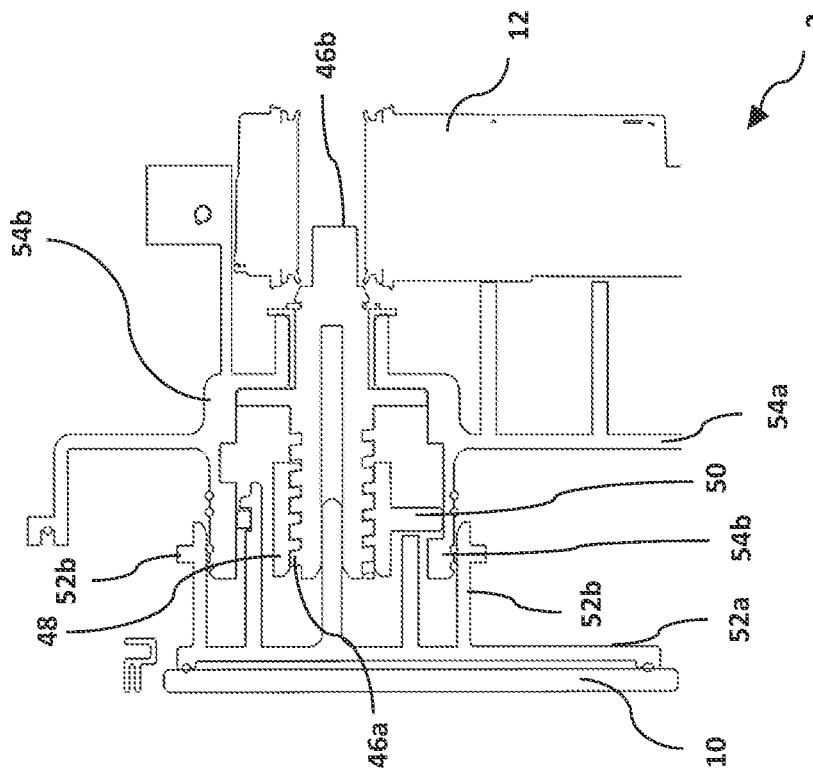
FIG. 8 shows a schematic representation of a motor-driven covering device in a sectional view according to a first embodiment example (left) and a second embodiment example (right).
Figure 8:
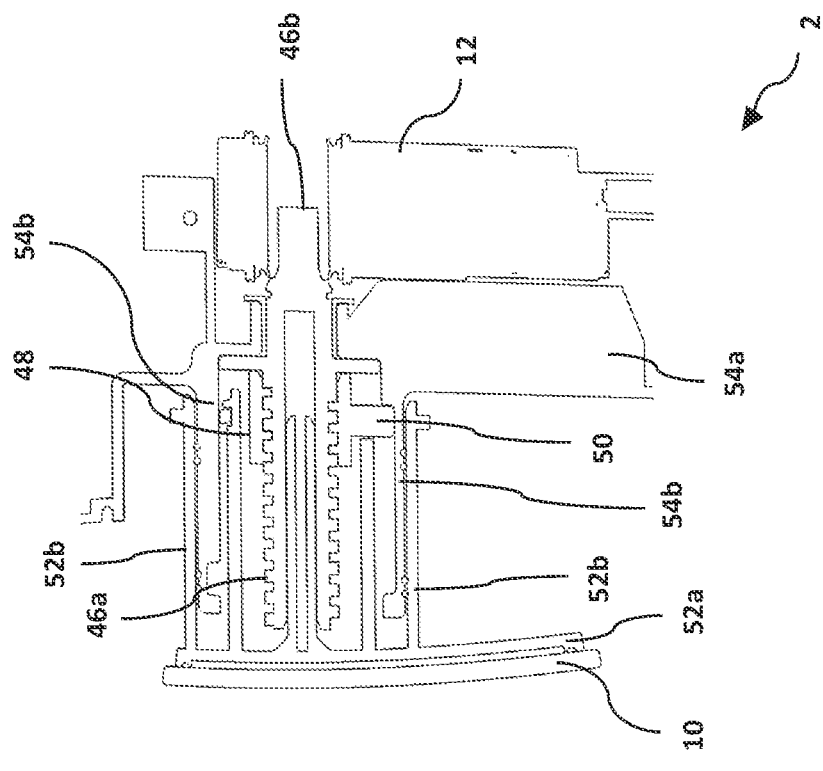

FIG. 8 shows a schematic representation of a motor-driven covering device (2) in a sectional view according to a first embodiment (left) and a second embodiment (right).

The motor-driven covering device (2) shown on the left side represents a covering device (2) that can be opened outwards, whereas the embodiment shown on the right side can be opened inwards.

In this case, the cover flap (10) or the carrier element (52) attached to the cover flap is pressed outwards during an opening process driven by the motor (12) via the drive spindle (46) or the control head (48) in the first embodiment, whereas the cover flap (10) or the carrier element (52) attached to the cover flap is pulled inwards during an opening process driven by the motor (12) via the drive spindle (46) or the control head (48) in the second embodiment.

Figure 9:
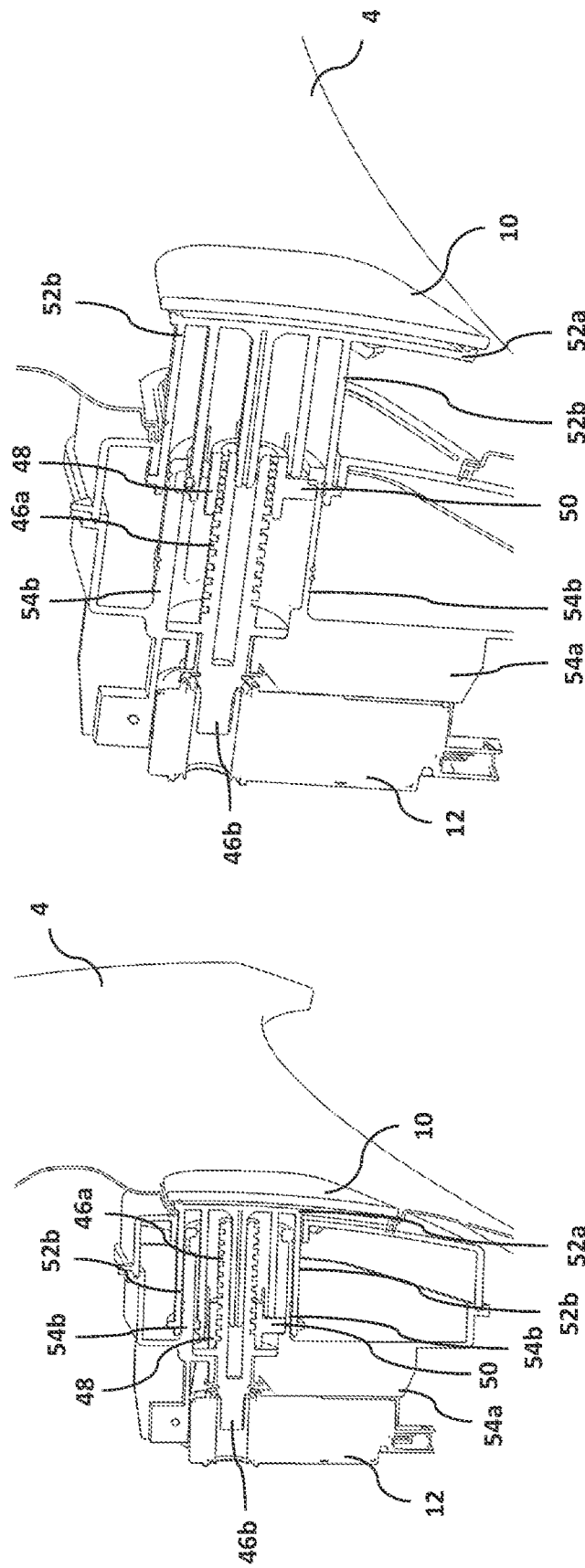
FIG. 9 shows a schematic representation of a motor-driven covering device in a sectional view according to a first embodiment example in a closed state (II) (left) and an open state (I) (right).

FIG. 9 shows a schematic representation of a motor-driven covering device (2) in a sectional view according to a first embodiment example in a closed state II (left) and an open state I (right).

As can also be seen from FIG. 9, the cover flap (10) or the carrier element (52) attached to the cover flap is pressed outwards during an opening process driven by the motor (12) via the drive spindle (46) or the control head (48).

Figure 10:
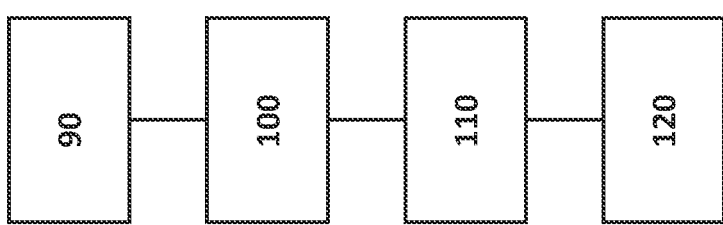
FIG. 10 shows a schematic representation of the individual steps/stages of a method for covering and exposing a charging connection arranged on the body of an electric vehicle.

FIG. 10 shows a schematic representation of the individual steps/stages of a method for covering and exposing a charging connection (8) arranged on the body of an electric vehicle.

As can be seen in FIG. 10, the method comprises the steps/stages of detecting (90) an opening and/or closing command by means of a sensor, controlling (100) a motor (12), which is operatively connected to a cover flap (10), for driving an opening movement and a closing movement of the cover flap (10), transmitting (110) a motor power of the motor (12) via a power transmission means/device (14) for performing the opening movement and the closing movement of the cover flap (10), and guiding (120) the cover flap (10) along a movement path during the opening movement and the closing movement of the cover flap (10) by means of a guide means/element (18), wherein the cover flap (10) is moved at least partially along the body (4) of the electric vehicle (6) during the opening and closing movement in a motor-driven manner, wherein a rotary movement of the motor (12) on or parallel to the axis of rotation (X) of the motor (12) is transmitted by the power transmission means/device (14) without additional means/elements in order to execute the opening movement and the closing movement of the cover flap (10).

By means of the motor-driven covering device as well as by means of the method, it is in particular possible to provide a covering device for covering and exposing a charging connection arranged on the body of an electric vehicle, which has a minimum space requirement during a charging process and at the same time offers safe charging, safe opening and safe closing of the cover flap as well as a high degree of charging comfort, while at the same time being constructively simple and inexpensive to manufacture.

LIST OF REFERENCE SIGNS

2 Motor-driven covering device
4 Car body
6 Electric vehicle
8 Charging connection
10 Cover flap
10*a* Fixing pin
12 Motor
12*a* Motor Opening
14 Power transmission means/device
16 Vehicle exterior
18 Guide means/element
46 Drive spindle
46*a* Drive thread
46*b* Drive pin
48 Control head
50 Fixing bars
52 carrier element
52*a* Front surface unit
52*b* Guide tube
52*c* Recesses
54 Base element
54*a* Carrying frame
54*b* Control tube
54*c* Fixing elements
56 Guide channel
56*a* shape-corresponding recesses
56*b* axially running guide channel course
56*c* radially running guide channel course
90 Detection of an opening and/or closing command
100 Controlling of a motor operatively connected to a cover flap
110 Transmission of a motor power
120 Guiding the cover flap along a movement path I Open state
II closed state
X Axis of rotation While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A motor-driven covering device for covering and exposing a charging connection arranged on a body of an electric vehicle with respect to a vehicle exterior, comprising:

a cover flap for covering the charging connection in a closed state and for exposing the charging connection in an open state, a motor operatively connected to the cover flap for driving an opening movement and a closing movement of the cover flap, the motor having an axis of rotation, a power transmission device for transmitting a motor power of the motor for carrying out the opening movement and the closing movement of the cover flap, a guide element for guiding the cover flap along a movement path during the opening movement and the closing movement of the cover flap, wherein the motor-driven covering device is configured in such a way that the cover flap can be moved at least partially along the body of the electric vehicle during the opening and closing movement, driven by the motor, wherein a rotary movement of the motor can be transmitted by the power transmission device in order to execute the opening movement and the closing movement of the cover flap, wherein a longitudinal axis of the power transmission device is arranged on or parallel to the axis of rotation of the motor and is in engagement with the motor, wherein the guide element is formed in a plurality of parts and has at least one carrier element for fixing the cover flap and a base element, which is operatively connected to the carrier element, for positioning between the motor and the one carrier element, wherein the carrier element comprises a front surface unit and a guide tube arranged at the front surface unit for receiving a control tube of the base element.

2. The motor-driven covering device according to claim 1, wherein the power transmission device is formed in a shape of a linear drive, the linear drive having at least one drive spindle and a control head, which is operatively connected to the drive spindle for transmitting a motor power of the motor in order to execute the opening movement and the closing movement of the cover flap.

3. The motor-driven covering device according to claim 2, wherein at least the drive spindle has a drive thread and a drive pin, arranged at an end, for insertion into an opening of the motor or the control head has a drive thread and fixing bars for fixing the control head during an opening movement and a closing movement.

4. The motor-driven covering device according to claim 3, wherein the motor is in a form of an actuator, the motor having an opening for receiving the drive pin of the drive spindle.

5. The motor-driven covering device according to claim 1, wherein the front surface unit of the carrier element has recesses for receiving fixing pins of the cover flap in a form-corresponding manner.

6. The motor-driven covering device according to claim 1, wherein the base element comprises a carrying frame and a control tube arranged on the carrying frame for receiving a drive spindle and a control head.

7. The motor-driven covering device according to claim 1, wherein fixing elements are provided for fixing the base element to a vehicle body.

8. The motor-driven covering device according to claim 6, wherein the control tube has a guide channel for guiding the control head.

9. The motor-driven covering device according to claim 8, wherein the guide channel for guiding the control head has an axially running guide channel course for axial guidance of the control head over fixing bars and a radially running guide channel course, arranged at an end, for radial guidance of the control head.

10. The motor-driven covering device according to claim 1, wherein the motor-driven covering device is configured in such a way that the cover flap, in an opening movement driven by the motor, can initially be moved perpendicularly to the body counter to a direction of the charging connection or in the direction of the charging connection.

11. The motor-driven covering device according to claim 1, wherein the motor-driven covering device is configured in such a way that the cover flap can be rotated laterally along the body in a rotational movement at the end of an opening movement after a movement perpendicular to the body counter to the direction of the charging connection or in the direction of the charging connection.

12. The motor-driven covering device according to claim 1, wherein the motor-driven covering device is configured in such a way that the cover flap can in a closing movement driven by the motor, first be rotated laterally along the body in a rotational movement before the cover flap, driven by the motor, can be moved perpendicularly to the body counter to the direction of the charging connection or in the direction of the charging connection.

13. An electric vehicle, comprising a charging connection for insertion of a charging plug and a motor-driven covering device according to claim 1.

14. The electric vehicle according to claim 13, wherein at least the charging connection is arranged on a side of the electric vehicle or the charging connection is arranged in a front area of the electric vehicle.

15. A method for covering and exposing a charging connection arranged on the body of an electric vehicle with respect to a vehicle exterior, using a motor-driven covering device according to claim 1, comprising:

controlling a motor operatively connected to a cover flap for driving an opening movement and a closing movement of the cover flap, transmitting a motor power of the motor via a power transmission device for carrying out the opening movement and the closing movement of the cover flap, and guiding the cover flap along a movement path during the opening movement and the closing movement of the cover flap by means of a guide element, wherein the cover flap is moved at least partially along the body of the electric vehicle during the opening and closing movement in a motor-driven manner, a rotary movement of the motor on or parallel to the axis of rotation of the motor being transmitted by the power transmission device in order to execute the opening movement and the closing movement of the cover flap, wherein the guide element is formed in a plurality of parts and has at least one carrier element for fixing the cover flap and a base element, which is operatively connected to the carrier element, for positioning between the motor and the one carrier element, wherein the carrier element comprises a front surface unit and a guide tube arranged at the front surface unit for receiving a control tube of the base element.

16. The method according to claim 15, wherein before a motor which is operatively connected to a cover flap is controlled, at least an opening or closing command for at least opening or closing the cover flap is detected by means of a sensor.

17. The method according to claim 15, wherein during an opening and closing movement of the cover flap, a movement of the cover flap in a direction of the body or away from the body is performed.

18. The method according to claim 15, wherein at least during an opening movement of the cover flap, an axial translational movement of the cover flap is first carried out counter to or in a direction of the charging connection before a radial pivoting movement is carried out at an end of an opening movement of the cover flap or wherein during a closing movement of the cover flap, a radial swiveling motion is first performed, before an axial translational movement of the cover flap is performed against or in the direction of the charging connection.

* * * * *